Patented July 14, 1953

2,645,630

UNITED STATES PATENT OFFICE 2,645,630

PHENYLOL SILANE-FORMALDEHYDE TYPE RESIN

John L. Speier, Jr., Pittsburgh, Pa., assignor to Dow Corning Corporation, Midland, Mich., a corporation of Michigan No Drawing. Original application September 18, 1950, Serial No. 185,517, now Patent No. 2,611,777, dated September 23, 1952. Divided and this application January 28, 1952, Serial No. 268,666. In Great Britain November 29, 1949

5 Claims. (Cl. 260—53)

The present invention relates to certain phenylol silanes, to their production, and to resins prepared therefrom.

The remarkable growth of the organosilicon industry has been founded primarily upon silicon materials in which the organic substituents are hydrocarbon radicals. Such materials are desirable due to their inert character, inherent in the hydrocarbon radicals. In order to employ organosilicon materials to advantage in synthetic chemistry, it is necessary that the silicon atom carry radicals with active substituents therein. The silanes to which this invention relates are those in which the active substituents are phenylol radicals.

Silanes in accordance herewith are of the following general formula:

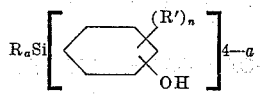

In the above formula R represents alkyl radicals such as methyl, ethyl, or higher, for example, octadecyl and cyclohexyl. R' represents an alkyl radical such as methyl, ethyl, or a higher alkyl such as octadecyl or cyclohexyl or a monocyclic aryl radical such as phenyl. In this formula $a$ is an integer of from 2 to 3, inclusive, and $n$ is an integer of from 0 to 1, inclusive. The compounds hereof of the above formula are of utility as bactericides and fungicides.

Resins in accordance with the present invention are prepared by reacting the phenylol silanes with hexamethylenetetramine. The resinous polymers so obtained may be employed as thermosetting resins for the production of improved molded products.

The phenylol silanes hereof may be produced in accordance herewith by hydrolyzing phenoxysilanes which correspond to the general formula

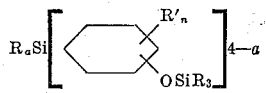

An obvious method for the preparation of these compounds is by the preparation of a Grignard reagent from a chloro- or bromophenol and the reaction of such a Grignard reagent with a chlorosilane. This method does not work. In accordance herewith, the hydroxyl of a halophenol is first blocked by reacting the halophenol with a chlorosilane, such as trimethylchlorosilane to form a halophenoxysilane. It is then possible to interact this halophenoxysilane with a chlorosilane as for example, trimethylchlorosilane or dimethyldichlorosilane. This reaction is conducted by contacting a mixture of the chlorosilane and the halophenoxysilane with a molten alkali metal. In this way the trimethylsiloxyphenyl radical is linked to silicon as shown in the above formula.

The silylphenols of this invention are prepared by hydrolyzing the above compounds according to the following schematic equation:

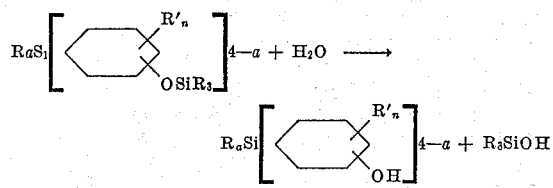

The above hydrolysis is best effected by carrying out the reaction in a homogeneous liquid phase. The rate of hydrolysis is substantially increased by the use of either an acidic or basic material soluble in the water. The effect is purely catalytic, as is well known in organic hydrolyses. The amount employed can be extremely minute. Suitable catalysts are such as acetic acid, hydrochloric acid, and sodium hydroxide.

The reaction of a phenylolsilane with hexamethylene tetramine proceeds very readily to yield a phenolic resin in which silicon atoms are attached to the phenyl radicals. The rate of reaction is, of course, increased at elevated temperatures. For this reason, a reaction temperature above 100° C. is preferred. The para isomers of the silylphenols appear to be particularly successful for reactions of this type, and are preferred.

The properties of the silyl phenolic resins may be varied by varying the ratio of hexamethylenetetramine to phenylolsilane. Ordinarily the preferred ratio of these reactants is from 1 to 2 equivalents of the hexamethylenetetramine per equivalent of phenylolsilane. An "equivalent" of hexamethylenetetramine is herein used to mean one sixth of its molecular weight. As applied to a phenylolsilane, an equivalent furnishes one phenol radical.

The silyl phenolic resins, like the well known phenolic resins, may exist in three definite conditions. When a low proportion of hexamethylenetetramine is used, or when the reaction is stopped before going to completion, a soluble type of resin is produced. When more hexamethylenetetramine is used, or when the reaction is allowed to proceed by further heating, an insoluble resin is produced which is thermoplastic and hence capable of being molded. Further heating may then be applied to this second stage resin, along with added hexamethylenetetramine if desired, to convert it to the insoluble, infusible state.

The properties of the molded resin may be varied by incorporating well known fillers such as for example wood flour, cotton linters, clays, talc, diatomaceous earth, asbestos, mica, glass fibers, graphite, and carbon black. Modifiers such as natural resins, fatty acids, glycerol, and alkyd resins may also be incorporated.

The successful reaction of hexamethylenetetramine with phenylolsilanes to give phenol-formaldehyde type condensation resins containing silicon was unexpected, because attempts to use aqueous formaldehyde in comparable reactions resulted in cleavage of the phenolic group from the silicon.

The following examples are illustrative only. In the examples, Me represents a methyl radical, and Et represents an ethyl radical.

*Example 1*

100 grams of sodium was melted by refluxing in 400 cc. of toluene. A mixture of 401 grams of p-chlorophenoxytrimethylsilane and 237 grams of trimethylchlorosilane was added to the sodium at such a rate that the toluene continued to reflux. The mixture was refluxed one-half hour after addition was complete. The solution was filtered, and the filtrate was distilled, whereupon p-Me₃SiC₆H₄OSiMe₃ was obtained.

25 ml. of this product were dissolved in 25 ml. of ethyl alcohol and acidified with five drops of concentrated HCl and then diluted with a few ml. of water. The mixture warmed due to heat of reaction. It was cooled and diluted with more water. The insoluble organic layer was separated and chilled to 20° C. Crystals of p-trimethylsilylphenol, p-Me₃SiC₆H₄OH, melting point 74° C., were obtained.

The phenol formed a 3,5-dinitrobenzoate, melting point 142.5° C., and alpha-naphthylurethane, melting point 153.5° to 155° C.

One equivalent of the p-trimethylsilylphenol was heated to 180° C. with two equivalents of hexamethylenetetramine. A thick resin, stringy and elastic at 180° C. soon formed. Upon cooling to room temperature this resin was solid and brittle. The solid was ground to a fine powder and mixed with asbestos powder and hexamethylenetetramine in the proportions:

| | Parts |
|---|---|
| Resin | 1.7 |
| Asbestos | 4.5 |
| Hexamethylenetetramine | 0.1 |

This powder was pressed in a mold at a temperature of 150° C. and a pressure of 2,000 p. s. i. for one hour, forming a hard, dense, smooth and strong bar. This bar was found to be extremely heat stable. When it was heated at 250° C. it showed no deterioration other than a slight darkening in color.

*Example 2*

By the procedure of Example 1, 214.5 grams of 3-methyl-4-chlorophenoxytrimethylsilane was reacted with 120 grams of trimethylchlorosilane and 50 grams of molten sodium in 200 cc. of boiling toluene. From the reaction there was obtained 3-Me-4-Me₃SiC₆H₃OSiMe₃.

This material was dissolved in ethyl alcohol and hydrolyzed as shown in Example 1. Upon cooling the hydrolyzate, 3-Me-4-Me₃SiC₆H₃OH, melting point 50° to 51° C., was obtained. This material formed a para-nitrobenzoate ester, melting point 129° C.

*Example 3*

According to the method of Example 1, 200 grams of o-chlorophenoxytrimethylsilane was reacted with 129 grams of trimethylchlorosilane and 49 grams of molten sodium. There was obtained o-Me₃SiC₆H₄OSiMe₃.

The produce was dissolved in acetone, acidified with five drops of HCl and hydrolyzed by adding water to the acid solution. Enough water was added to cause the separation of an insoluble layer which upon distillation gave o-Me₃SiC₆H₄OH, boiling point 121° C. at 26 mm., melting point 8.6° to 9.2° C. The phenol forms a 3,5-dinitrobenzoate which melts at 123° C.

*Example 4*

Using the procedure of Example 1, 39.1 grams of sodium in 150 ml. of refluxing toluene was reacted with 108 grams of ethyldimethylchlorosilane and 208 grams of p-bromophenoxyethyldimethylsilane. There was obtained

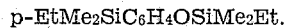
p-EtMe₂SiC₆H₄OSiMe₂Et.

The product was hydrolyzed according to the method of Example 3, whereupon

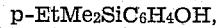
p-EtMe₂SiC₆H₄OH, boiling point 148° C. at 24 mm., melting point of 33° C., was obtained.

*Example 5*

Using the procedure of Example 1, 2-phenyl-4-chloro-phenoxytrimethylsilane was reacted with sodium and trimethylchlorosilane. The product obtained was

2-C₆H₅-4-Me₃SiC₆H₃OSiMe₃

Upon hydrolysis of the product in accordance with the method of Example 1, 2-phenyl-4-trimethylsilylphenol, boiling point 198° C. at 25 mm., was obtained.

*Example 6*

In accordance with the procedure of Example 1, two equivalents of parachlorophenoxytrimethylsilane were reacted with one equivalent of dimethyldichlorosilane and two equivalents of sodium. The reaction product was distilled, yielding bis(p-trimethylsiloxyphenyl)dimethylsilane and a very viscous non-distillable residue.

The bis(p-trimethylsiloxyphenyl)dimethylsilane was hydrolyzed by the procedure of Example 3, producing the diphenol

Me₂Si(C₆H₄OH)₂ melting point 171°C.

The viscous non-distillable residue was hydrolyzed by the same procedure, forming a crystalline mass of phenolic material containing a considerable amount of the same diphenol isolated above along with unidentifiable complex phenolic siloxanes. This crude phenolic product was heated to 150° C. to drive off water, acetone, and the hexamethyldisiloxane formed by hydrolysis of the trimethylsiloxy ester present in the original reaction. 12 parts by weight of this devolatilized phenolic residue was mixed with 1.3 parts by weight of hexamethylenetetramine and heated at 150° C. with stirring. Soon the mixture became viscous and started to gel. Just short of the gel stage, 12 parts of asbestos fiber were stirred into the resin. The gelled resin was then cooled and ground to a fine powder. The dry powder thus produced was molded at a pressure of 2,000 p. s. i. and at a temperature of 155° C. to 165° C. for 40 minutes. The molded product in the form of a bar was very strong and had a hard smooth surface. A piece of this bar was heated at 200° C. for 10 days and showed no deterioration other than a slight darkening in color. A second piece of the bar was heated at 250° C. for 90 hours. This also darkened, but showed no other effect of the high temperature. Both pieces retained their hardness and strength, and there was no noticeable softening at the 250° C. temperature.

*Example 7*

Using the procedure of Example 1, two equivalents of 2-methyl-4-chlorophenoxytrimethylsilane, one equivalent of dimethyldichlorosilane, and two equivalents of sodium were reacted. The product obtained was bis(3-methyl-4-trimethylsiloxyphenyl) dimethylsilane.

This product was hydrolyzed according to the procedure of Example 3, whereupon bis(3-methyl-4-hydroxyphenyl)dimethysilane, melting point 208° to 210° C., was obtained.

The present application is a division of application Serial No. 185,517 (now Patent No. 2,611,777), filed September 18, 1950.

The embodiments of the invention in which an exclusive property or privilege is claimed are defined as follows:

1. A silylphenol-formaldehyde type condensation resin comprising the reaction product of an alkylsilylphenol, in which all of the valencies of the silicon atom are satisfied by alkyl radicals and phenolic radicals, with hexamethylenetetramine.

2. A silylphenol-formaldehyde type condensation resin comprising the reaction product of a compound of the formula

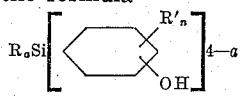

in which R represents an alkyl radical, R' is a radical selected from the group consisting of alkyl and phenyl radicals, $a$ is an integer of from 2 to 3, inclusive, and $n$ is an integer of from 0 to 1, inclusive, with hexamethylenetetramine.

3. The reaction product of claim 2 where R represents a methyl radical.

4. The method of preparing a silylphenol-fomaldehyde type condensation resin which comprises reacting a phenylolsilane of the formula

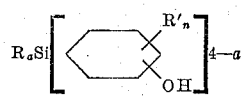

in which R represents an alkyl radical, R' is a radical selected from the group consisting of alkyl and phenyl radicals, $a$ is an integer of from 2 to 3 inclusive, and $n$ is an integer of from 0 to 1 inclusive, with hexamethylenetetramine at a temperature above 100° C.

5. A silylphenol-formaldehyde type condensation resin comprising the reaction product of

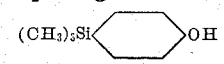

with hexamethylenetetramine.

JOHN L. SPEIER, JR.

References Cited in the file of this patent

UNITED STATES PATENTS

| Number | Name | Date |
|---|---|---|
| 2,258,222 | Rochow | Oct. 7, 1941 |
| 2,555,489 | Hirsch | June 5, 1951 |
| 2,588,083 | Burkhard | Mar. 4, 1952 |